United States Patent [19]
Terhune et al.

[11] Patent Number: 5,608,767
[45] Date of Patent: Mar. 4, 1997

[54] NEUTRON-ACTIVATED DIRECT CURRENT SOURCE

[75] Inventors: James H. Terhune, San Jose; Robert L. Cowan, II, Livermore, both of Calif.

[73] Assignee: General Electric Company, San Jose, Calif.

[21] Appl. No.: 505,412

[22] Filed: Jul. 21, 1995

Related U.S. Application Data

[63] Continuation-in-part of Ser. No. 384,997, Feb. 7, 1995, which is a continuation-in-part of Ser. No. 239,773, May 9, 1994, Pat. No. 5,444,747.

[51] Int. Cl.$^6$ .................................................... G21C 19/28
[52] U.S. Cl. .................... 376/321; 376/321; 376/158; 376/461; 376/317; 376/305
[58] Field of Search .................................. 376/372, 321, 376/158, 461, 317, 253, 305; 310/301, 305, 303; 136/202

[56] References Cited

U.S. PATENT DOCUMENTS

| | | | |
|---|---|---|---|
| 3,678,303 | 7/1972 | Round | 310/3 R |
| 3,767,947 | 10/1973 | Adler et al. | 310/30 |
| 4,010,534 | 3/1977 | Anthony et al. | 29/572 |
| 4,024,420 | 5/1977 | Anthony et al. | 310/3 B |
| 4,215,189 | 7/1980 | Bergum et al. | 429/217 |
| 4,489,269 | 12/1984 | Edling et al. | 322/2 R |
| 5,060,805 | 10/1991 | Fujii et al. | 209/3 |
| 5,108,696 | 4/1992 | Heck | 376/300 |
| 5,235,232 | 8/1993 | Conley et al. | 310/303 |

*Primary Examiner*—Michael J. Carone
*Assistant Examiner*—Meena Chelliah
*Attorney, Agent, or Firm*—James E. McGinness

[57] ABSTRACT

A device for generating direct current by neutron activation of a plurality of series-connected beta-emitter (nuclear decay electron) cells, located in the out-of-core region of a light water nuclear reactor. The device can be used as either a current source, or preferably configured as a DC voltage source, capable of powering low-power, radiation-hardened, high-temperature integrated circuitry contained in the reactor vessel. As such, the device acts like a DC battery that is activated by (n, γ) reactions, both thermal and epithermal (by resonance capture). The device is not operable until exposed to a substantial neutron flux, so it has unlimited shelf-life and is not radioactive during manufacture In the preferred embodiment, an isotope of the metallic rare-earth element dysprosium is configured in a "sandwich" geometry to generate sufficient current that a useful steady voltage can be generated by means of a simple voltage regulation circuit.

20 Claims, 5 Drawing Sheets

NEUTRON-ACTIVATED DIRECT CURRENT SOURCE

RELATED PATENT APPLICATIONS

This is a continuation-in-part application of U.S. patent application Ser. No. 08/384,997 filed on Feb. 7, 1995, which in turn is a continuation-in-part application of U.S. patent application Ser. No. 08/239,773 filed on May 9, 1994, U.S. Pat. No. 5,444,747.

FIELD OF THE INVENTION

This invention generally relates to stand-alone means for generating low-power direct current or DC voltage.

BACKGROUND OF THE INVENTION

FIG. 1 shows an apparatus, disclosed in U.S. patent application Ser. No. 08/384,997, for electrically suppressing the electrochemical potential (ECP) near a BWR component which is susceptible to intergranular stress corrosion cracking (IGSCC). The apparatus is a self-contained means of locally protecting critical portions of metals, such as welds, by suppressing ECP in the immediate vicinity of that portion of the metal requiring protection in operating BWR plants.

The apparatus shown in FIG. 1 is based on the concept of supplying electrons directly and locally to the surface of a sensitized metallic structural member 2, as in the case of the heat affected zone 6 of a weld 4, thereby inhibiting IGSCC. The electrical system depicted in FIG. 1 is capable of supplying sufficient electrons to the metal surface to inhibit the corrosion reaction due to local ECP exceeding the threshold value at which IGSCC can occur.

In the circuit of FIG. 1, the center electrical conductor of a small mineral-insulated steel sheathed cable 16 is attached to the metal surface to be protected against IGSCC and connected to an electrical control circuit 10 that operates off the low-voltage DC power supply 20. The control circuit 10 and DC power supply 20 are enclosed in a housing 8 made of material able to withstand thermal and radiological conditions inside a boiling water reactor, but outside the reactor core. The passive conductor of a twisted-shielded pair of cable conductors is connected to a reference electrode 18 located in the oxidizing coolant near the metal surface and to a terminal of the control circuit. The current collected at the metal surface is controlled by the applied voltage on the load resistor R via an electrical conductor connected to the surface of the metal to be protected and to another terminal of the control circuit. This current I is converted to a voltage drop across R, which is input to a differential amplifier 12 of gain G. The differential amplifier output is the effective voltage "error signal", which is integrated by the operational amplifier 14 with time constant $\tau=R_1 C$. The small stand-off resistor $R_2$ depletes excess charge build-up on the feedback capacitor C to eliminate any possibility of integrator malfunction. The collected current is dissipated in the load resistor R. Electron depletion of the metal and IGSCC are defeated since electrons are forced to flow into the metal to compensate for those that would be lost by oxidation of the metal.

The apparatus shown in FIG. 1 has a power supply 20 which requires no external power source, but rather is energized by electrons (also referred to herein as β-particles) produced during nuclear decay. The source of electrons was the β-decay of a radioactive isotope, depicted in FIG. 1 as a current source 22.

β-decay is a common decay mode of many nuclear isotopes whereby the nucleus spontaneously converts a neutron to an energetic electron (β-particle) ejected from the nucleus, a proton retained in the nucleus and an antineutrino. β-decay is a manifestation of the so-called weak force in the nucleus, which obeys all the classical conservation laws, except parity in a small percentage of decay events. It is known, both theoretically and experimentally, that the emitted electron cannot exist in the nucleus prior to emission. It is created, in every respect exactly like any electron, during the decay process, in which the original nucleus is converted to a new element with the same mass number (A), but with one additional proton ($Z \rightarrow Z+1$).

β-particles (or rays) can carry substantial kinetic energy when emitted. The energy distribution (spectrum) of these particles is continuous end displays a maximum energy, above which no particles exist. Their absorption in materials is known to vary inversely as a power law in the maximum energy ($E_{max}$) and the spectrum is unchanged by absorption. In particular, the measurable activity of a β-emitter is limited by self-absorption in the source itself, a factor that must be considered when designing devices employing β-radiation. Typically β-particles can be stopped by a millimeter thickness of most materials. Therefore, β-sources are inherently weak sources of radiation dosage.

Alternative modes of decay usually exist for many β-emitters, such as electron capture, internal conversion, isomeric transition (γ-emission), and positron emission. These competing modes do not produce useful electrons, so only the fraction of decay events that produce β-rays are of interest in the current context. Self-absorption also limits useful decay events to those that have a substantial maximum β-decay energy $E_{max}$ of the order of 1 MeV or greater. Therefore, all β-emitters are not viable candidates for use in a β-battery. In fact, it is not obvious that any isotope(s) exist with the requisite properties and lifetime.

SUMMARY OF THE INVENTION

The invention is a device for generating direct current by neutron activation of a plurality of series-connected beta-emitter (nuclear decay electron) cells, located in the out-of-core region of a light water nuclear reactor. The device can be used as either a current source, or preferably configured as a DC voltage source, capable of powering low-power, radiation-hardened, high-temperature integrated circuitry contained in the reactor vessel. As such, the device acts like a DC battery that is activated by (n, γ) reactions, both thermal and epithermal (by resonance capture). The device is not operable until exposed to a substantial neutron flux, so it has unlimited shelf-life and is not radioactive during manufacture.

In the preferred embodiment, a stable, i.e., nonradioactive isotope of the metallic rare-earth element dysprosium is configured in a "sandwich" geometry to generate sufficient current, when activated that a useful steady voltage can be generated by means of a simple voltage regulation circuit. This nuclear battery has a finite life, which depends on the flux levels it resides in and the current it is required to provide. Typically, the useful lifetime is several years for current output greater than a milli-amp. Other potential candidates for use in a β-battery activated by neutron absorption are $Sn^{122}$, $Cs^{133}$, $Tm^{169}$, $Lu^{176}$, $Ir^{191}$, $Ir^{193}$ and $In^{113}$.

The low-power, DC current source of the present invention provides means for generating electrical current directly from a neutron-activated isomeric decay chain, without intervening conversion equipment. It utilizes a DC circuit with radiation-hardened components to convert current to voltage, when required by the application, without the need for external power supplied to a nuclear reactor vessel. The invention further provides means for supplying constant voltage, through the application of a radiation-hardened voltage regulation circuit, to stand-alone electronic circuitry, operable inside nuclear reactor vessels and/or piping. The invention utilizes a specific nuclear isotope, not commonly applied in the generation of nuclear power and chosen for its nuclear and physical properties, to generate nuclear electrical current from the β-decay of (n, γ) reaction products. This facilitates the generation of low-power DC current or voltage inside the nuclear primary containment without costly electrical penetrations. The choice of the little known $Dy^{164}$ isotope allows for a sustained operating life in situ and a virtually unlimited shelf-life prior to insertion into the reactor. Battery life is extended when reactor shutdowns or power reductions occur, and ultimate end-of-life can be determined by proper design.

BRIEF DESCRIPTION OF THE DRAWINGS

FIG. 5, $Dy^{165m}$; FIG. 6, $Dy^{165}$; FIG. 7, $Dy^{166}$; FIG. 8, $Ho^{165}$.

DETAILED DESCRIPTION OF THE PREFERRED EMBODIMENT

Figure 2A:
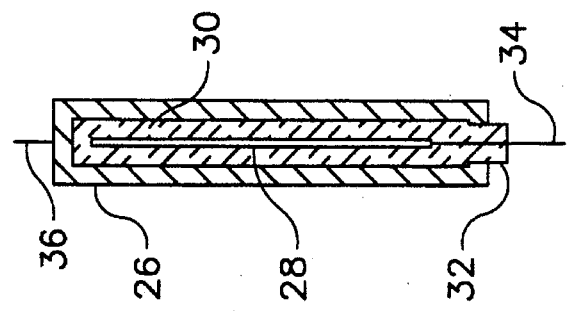
FIGS. 2A and 2B are elevation and plan sectional views respectively of a beta battery cell in accordance with the preferred embodiment of the invention.
Figure 2B:
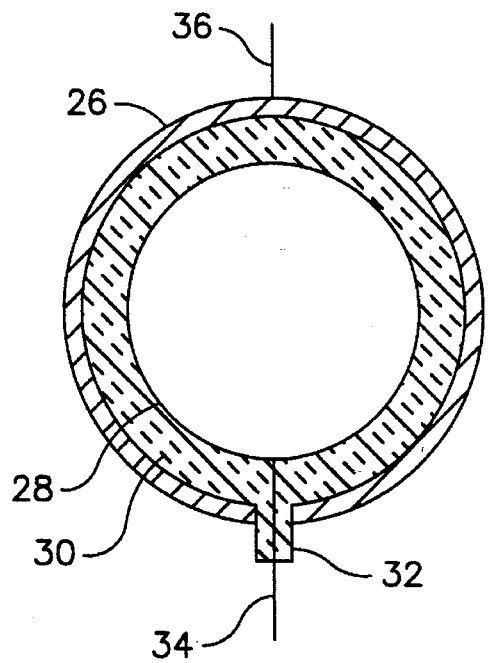

Referring to FIGS. 2A and 2B, the source assembly comprises a metallic collector 26 in the form of a hollow flat disk of metal containing the β-emitting isotope material 28, which is electrically isolated from the metallic collector 26 by ceramic stand-off 30 and ceramic feed-through 32. Preferably, the β-emitting isotope material 28 is centrally arranged inside the collector 26. A first electrical lead 34 is connected to the β-emitting material 28 and penetrates the ceramic stand-off 30. A second electrical lead 36 has an end connected to the metallic collector 26.

In accordance with one preferred embodiment, the β-emitting isotope material 28 is formed as a solid thin disk. Alternatively, the β-emitting isotope material 28 is deposited on a substrate formed as a solid thin disk, which substrate may be made of material which is not a β-emitter. Also, the ceramic material may be replaced by any other suitable electrically insulating material able to withstand the thermal and radiological conditions of the reactor environment.

In accordance with the preferred embodiment of the invention, the β-emitting radioisotope is derived from neutron-activated dysprosium, $Dy^{164}$. The neutron-activated partial decay scheme of pure $Dy^{164}$ is as follows:

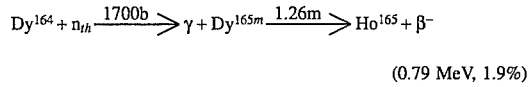

(0.79 MeV, 1.9%)

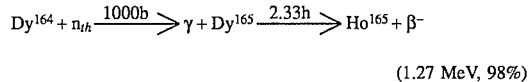

(1.27 MeV, 98%)

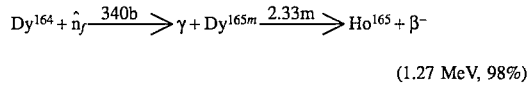

(1.27 MeV, 98%)

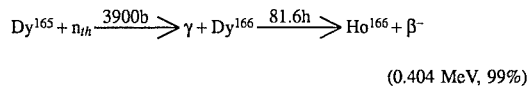

(0.404 MeV, 99%)

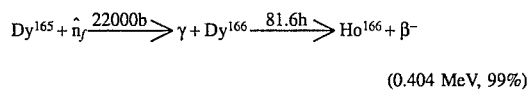

(0.404 MeV, 99%)

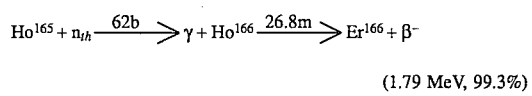

(1.79 MeV, 99.3%)

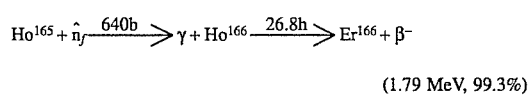

(1.79 MeV, 99.3%)

The notation used above is as follows: $n_{th}$, thermal neutron; $\hat{n}_r$, epithermal neutron at the central energy of an absorption resonance; b, barns; h, hours; d, days; m, months; and y, years. All reactions subsequent to the decay of $Ho^{166}$ have been neglected, although $Er^{166}$ can be neutron-activated to produce some weak β-emission. This chain displays promising properties, such as substantial activation cross sections and resonance integrals, moderate decay constants, energetic β-particles and high β-yields. There are four β-particles emitted in the chain of each $Dy^{164}$ nucleus, another favorable property.

$Dy^{164}$ is a naturally occurring, stable isotope of the rare-earth element dysprosium, found in the ratio of 28.1%. The pure metal is soft and malleable with density 8.55 gm/cc and melting point 1412° C. It is stable in air at room temperature and non-toxic. These properties make it easily fabricatable as thin foils and ideal for use in devices contained in nuclear reactors.

Figure 3:
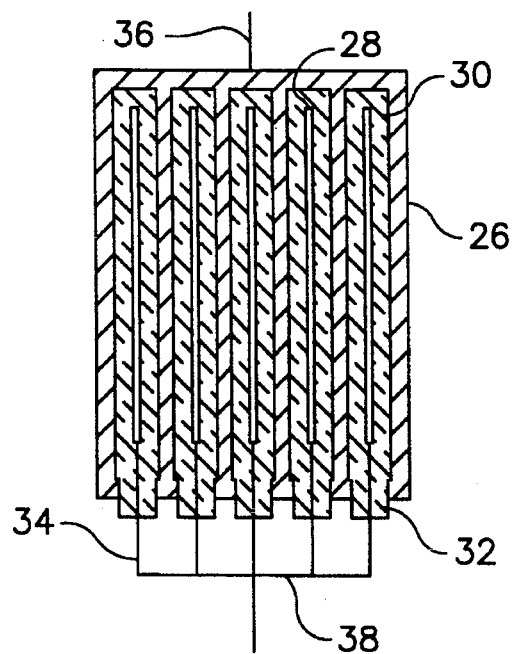
FIG. 3 is a schematic diagram of a 5-cell solid-state beta battery in accordance with another preferred embodiment of the invention.

The β-battery of the present invention is intended for use inside the reactor pressure vessel of a nuclear reactor, on the periphery or just outside the nuclear fuel core, where exposure to substantial neutron flux will activate the β-emitting material to produce electrons. In accordance with an alternative preferred embodiment of the present invention, the cell shown in FIGS. 2A and 2B may be replicated many times and connected together ("sandwiched") to provide adequate current for conversion to voltage in practical applications. FIG. 3 is a schematic representation of this configuration for five unit cells, although 20–30 is a more typical number. In each cell, a thin emitter foil 28, whose thickness is typically 1.5 mm, is electrically isolated by the thin ceramic disks 30 (thickness typically 0.025 mm). In the example shown, each cell has a thickness of about 1.8 mm. Therefore, a 30-cell battery is about 5.4 cm thick, with an outside diameter of roughly 8 cm. The feed-through ceramics 32 and leads 34, 36 can be deposited by electrodeposition during fabrication.

The plurality of cells composing a battery (see FIG. 3) are energized by the nuclear decay electrons that traverse the thin ceramic spacers and reach the collector electrodes. The output current from the common collectors is transmitted by mineral-insulated cable to a small circuit board used to convert variable current to constant voltage. For example, portions of the circuitry 20 shown in FIG. 1 could be placed on a circuit board for current-to-voltage conversion. The source current $I_s$ arising from the collection of nuclear decay electrons from all the emitters produces a voltage across a source resistance $R_s$ (see FIG. 1), which is a slowly decreasing function of time (because of the emitter decay). It should be understood that the source resistance $R_s$ represents the sum of the internal resistance of the current generator 22 and the resistance of a separate resistor. The Zener diode 24 and load resistor $R_L$ stabilize and limit the output voltage $B_+$ to an appropriate design level, determined by the resistors. The conversion voltage is regulated, since large changes in diode current produce small changes in diode voltage. The resulting voltage across the load resistor is insensitive to the β-emitter decay and can be used to power the active circuit components inside the reactor pressure vessel, without the necessity of external power. The electronic components are fabricated from radiation-hardened semiconductors (e.g., SiC semiconductor devices) capable of withstanding relatively high γ-radiation fields encountered inside the reactor pressure vessel, but outside the core region. The circuit device is not intended for use in the core, where neutron fluxes are sufficiently high to destroy the electronic components.

In accordance with the preferred embodiment of the present invention, the source of electrons is the decay of radioactive isotopes produced by neutron activation of $Dy^{164}$, which is formed as a thin foil held in place between adjacent ceramic members that are very thin. The emitter foil is electrically isolated from the metallic collector by these ceramic insulators. The collector material could be nickel, or a nickel-base alloy, and the ceramics could be alumina to thermally match the metal. These are typical materials, but other possible combinations exist which would allow the device to operate reliably at reactor temperature.

This low-voltage DC power supply has a finite lifetime, since the $Dy^{164}$ eventually "burns up" to such a low level that it cannot produce a supply voltage sufficient to power the circuit connected to it. This lifetime is determined by the type of application, such as the design requirements of the operational amplifiers in a control circuit. Typically, it is about 3 years at full power in the reactor, if the lowest permissible current is 1 mA.

The amount of current density j generated can be estimated from the following formula, which takes account of source decay and self-absorption:

$$j = N(\rho\zeta/A\tau\mu)e^{-t/\tau}[1-e^{-\mu l}] \text{amp/cm}^2$$

where l is the emitter thickness; ρ is the emitter density; A is the emitter mass number; τ is the emitter mean-life (1.44 $t_{1/2}$); ζ is the Faraday constant (96487 coulomb/gm-mole); μ is the electron absorption coefficient of the emitter/insulator; and N is the number of cells.

Figure 4:
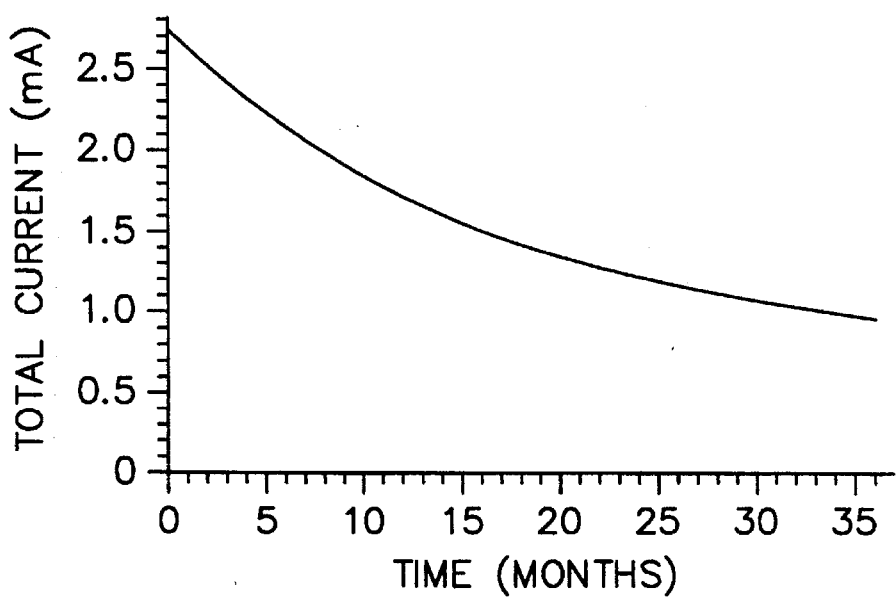
FIG. 4 is a graph of the total current produced by a 30-cell $Dy^{164}$ β-battery as a function of time.

For a β-battery using dysprosium, the current generated, as a function of time after being placed in reactor service and taking account of source burn-up and self-absorption, is shown for a typical case in FIG. 4. This graph is the algebraic sum of the four separate β-emitters in the decay chain of $(n+Dy^{164})$.

FIGS. 5–8 show the currents due to each constituent isotope, including the isomeric state of dysprosium, $Dy^{165m}$. It is noteworthy that the early currents are due to $Dy^{165}$, whereas the late currents are due to the eventual build-up and decay of the isotope $Ho^{166}$. The contribution of $Dy^{165}$ is negligible, since its β-emission is heavily self-absorbed and its generation rate is low.

The rise-time of the total current is very short (not resolved on the scale of the graphs). It turns out to take about a minute to activate the $Dy^{165}$ output to a level of 1 mA. Therefore, for all practical purposes, the battery is prompt upon exposure to low levels of neutrons.

Figure 9:
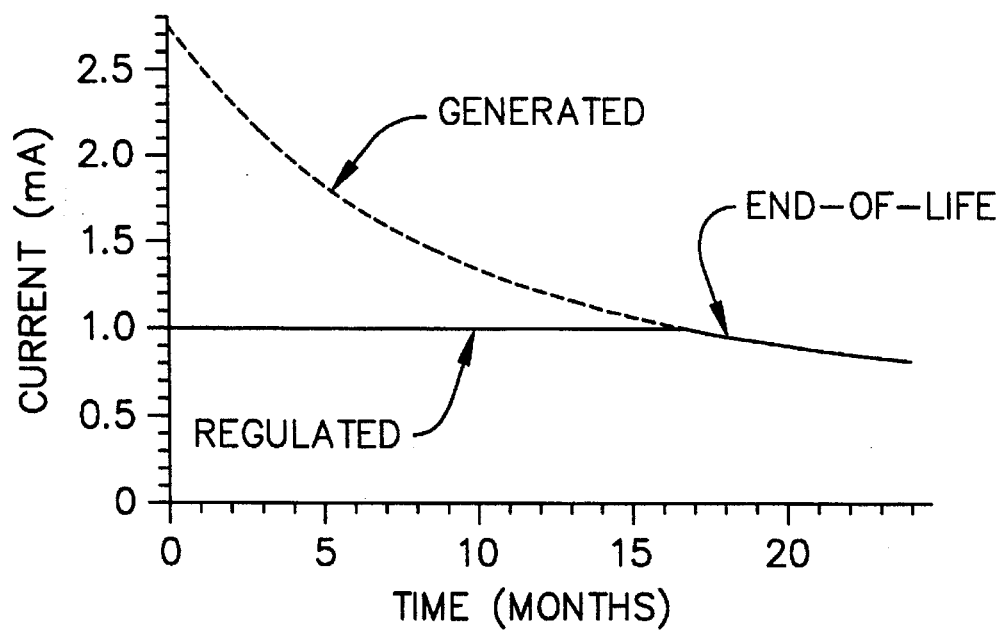
FIG. 9 is a graph of the voltage produced across a 4-kΩ resistor for a 30-cell $Dy^{164}$ β-battery as a function of time.

The voltage produced by the collected β-current is dependent on the resistance through which the current flows. This voltage varies with time in the same way the current varies, for a constant resistor. Using a typical resistance of 4 kΩ, the voltage characteristic of a 30-cell battery is shown in FIG. 9. When the generated voltage is fed through a voltage regulation circuit, the constant voltage shown in the graph is produced. The level of the regulated voltage is determined by design; the values shown are for illustration only.

Figure 5:
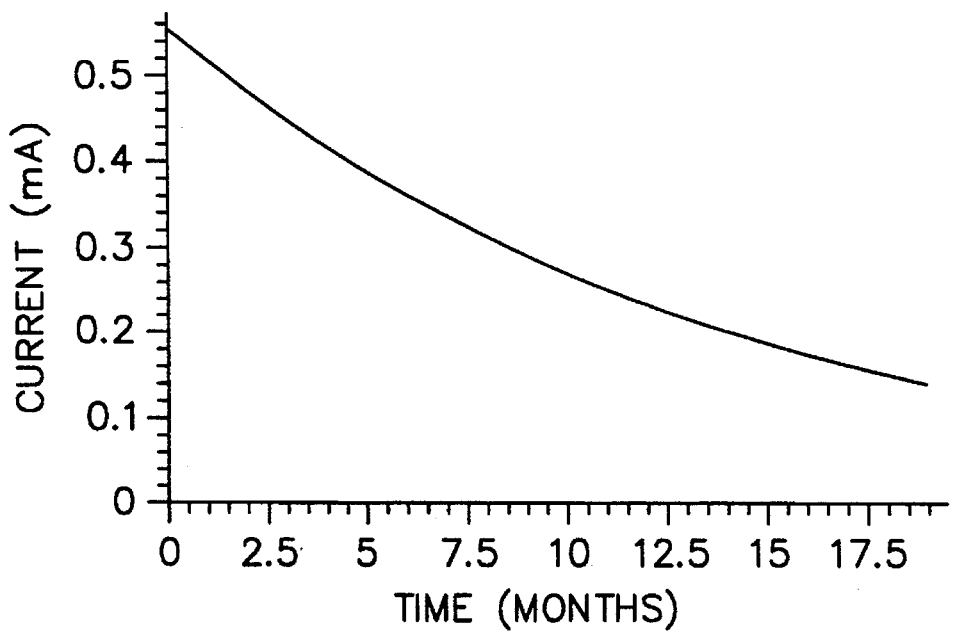
FIGS. 5–8 are respective graphs of the current produced by each constituent isotope in the decay chain of $(n+Dy^{164})$ as a function of time for the 30-cell $Dy^{164}$ β-battery.
Figure 6:
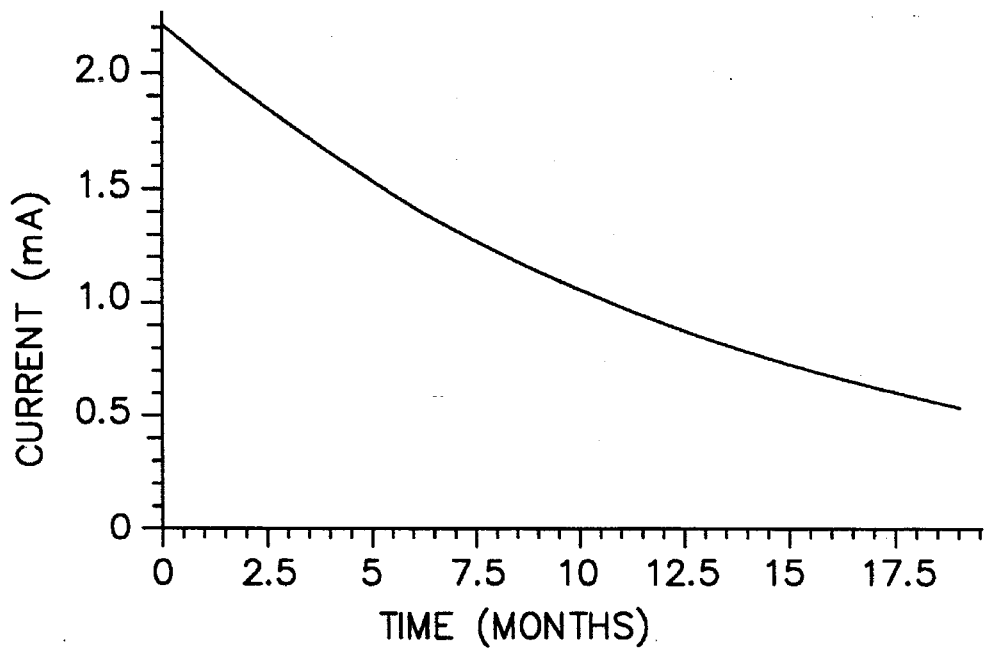
Figure 7:
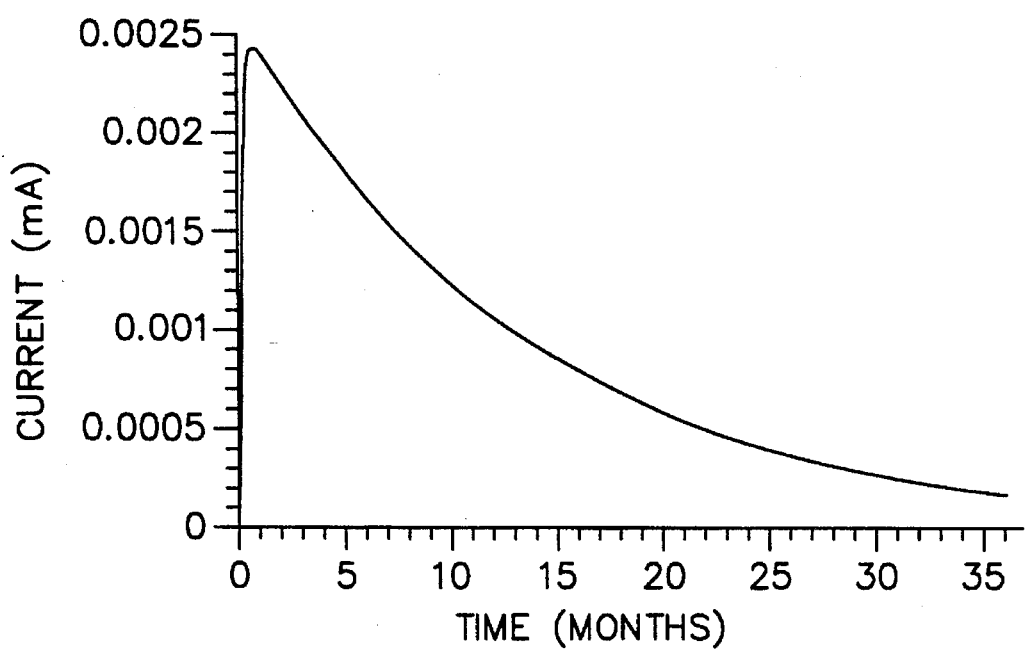
Figure 8:
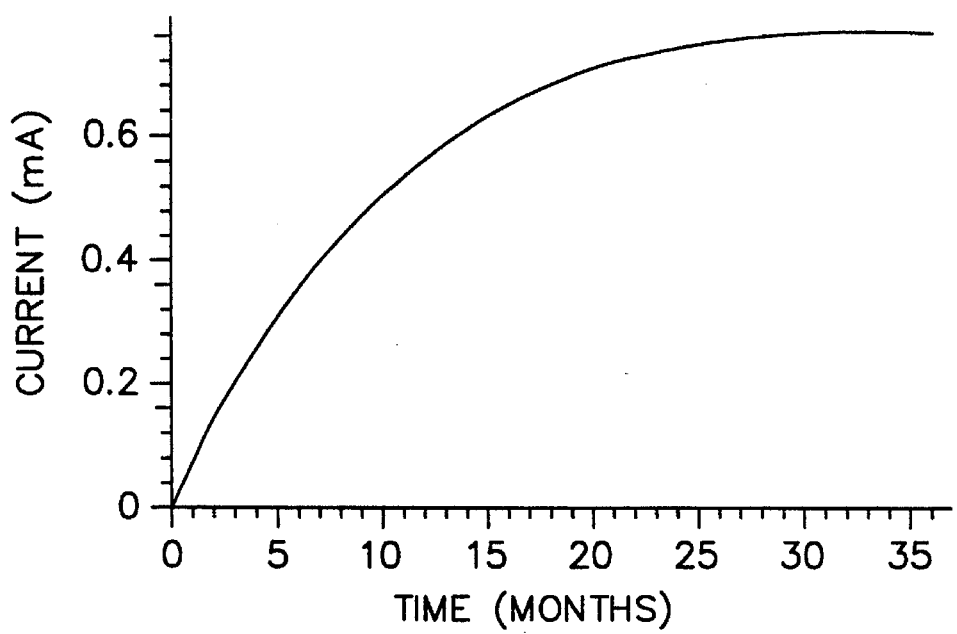

As seen in FIG. 9, battery life for this example is about 3 full-power-years, using an end-of-life criterion of 1 mA output current, which corresponds to 4 volts. The rise of $Ho^{166}$ (FIG. 8) peaks at about 32 full-power-months, which is the life extension mechanism. As the voltage sags below 4 volts, the voltage regulator becomes inoperative. The voltage gradually drops as the $Ho^{166}$ current decays. FIGS. 5–7 show that all precursors have decayed to insignificant levels of current production when the $Ho^{166}$ peak occurs.

When reactor Outages occur, or power is reduced, battery life is extended. Battery life is clearly a variable subject to design, within broad limits. The limiting factor in life of this source is the current demand. Effective lifetime and/or peak current capability can be addressed in the emitter design by combining more than one isotope in the proper proportions to give the desired current-time characteristic.

In accordance with an alternative preferred embodiment of the invention, the β-battery has a very thin layer of low-density ceramic electroplated on every emitter surface, which is used as a substrate. Then, the ceramic surfaces are metallized and then electroplated with a metal having suitable electrical conductivity. The metal electroplated cells are then bonded together to form a multi-cell array, an example of which is seen in FIG. 3. In this array, the metallic collectors 26 separate each unit cell and form a bus to which electrical lead 36 is connected. The electrical leads 34 are connected to a bus 38. The feed-through ceramics and leads are also deposited by electrodeposition. Processes and techniques similar to those used in semiconductor device fabrication are available for manufacture of the device.

The present invention can be used to power radiation-hardened circuitry located inside the primary pressure boundary of nuclear plants, without the necessity of electrical penetrations. The neutron-activated current generator is expected to be especially useful in operating plants where local protection of sensitized stainless steel components against intergranular stress corrosion cracking requires a long-lived, low-power, freestanding electrical source. The invention also has application in other reactor contexts, such as crud deposition suppression and monitoring of electrochemical corrosion potential.

Figure 1:
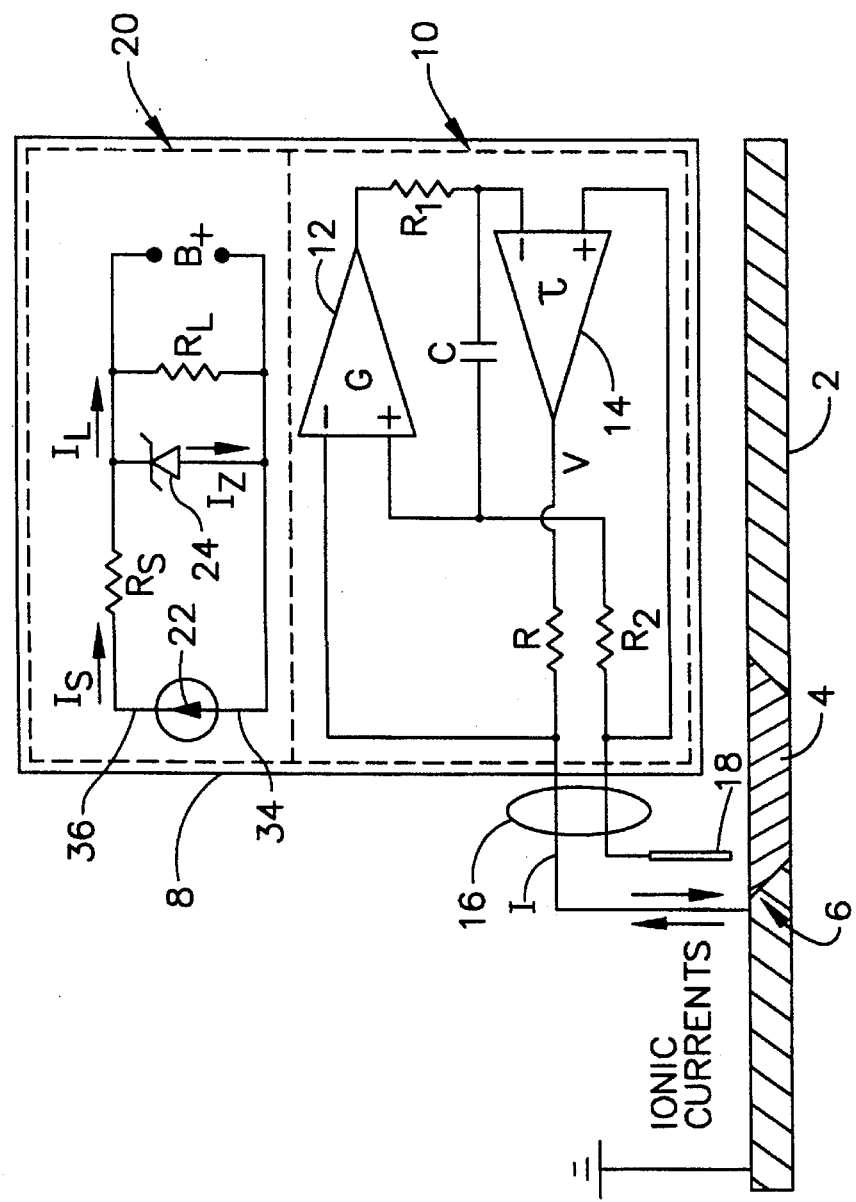
FIG. 1 is a schematic diagram of a self-contained IGSCC suppression system which is powered by a current source.

The preferred embodiments have been disclosed for the purpose of illustration only. Variations and modifications of those embodiments will be readily apparent to persons skilled in the art of battery design. For example, it will be appreciated that the β-emitter 28 in FIG. 2A need not be electrically connected and that electrical conductor 34 can be eliminated, in which case the Zener diode 24 will not be connected to the current source via conductor 34, as shown in FIG. 1. Although the electrical conductor 34 prevents the build-up of a space charge which could suppress the ability of electrons to flow out of the emitter, this is not essential to the present invention. All such variations and modifications are intended to be encompassed by the claims appended hereto.

We claim:

1. A neutron-activatable battery comprising a mass of stable isotope material, a metallic collector electrically insulated from said stable isotope material by electrically insulating material, and an electrical lead connected to said metallic collector, wherein said stable isotope material has the property of capturing neutrons from a neutron flux and being activated by neutron capture to a radioactive state having a subsequent decay chain during which at least one β-particle is emitted.

2. The neutron-activatable battery as defined in claim 1, wherein said stable isotope material is $Dy^{164}$.

3. The neutron-activatable battery as defined in claim 1, wherein said stable isotope material is in the form of a metallic foil.

4. The neutron-activatable battery as defined in claim 1, further comprising a substrate, wherein said stable isotope material is electroplated on a surface of said substrate.

5. The neutron-activatable battery as defined in claim 4, wherein said electrically insulating material is electroplated on a surface of said stable isotope material.

6. The neutron-activatable battery as defined in claim 1, wherein said electrically insulating material is ceramic.

7. The neutron-activatable battery as defined in claim 1, wherein a surface of said electrically insulating material is metallized and said metallic collector is electroplated on said metallized surface of said electrically insulating material.

8. A neutron-activated direct current source comprising:
a source of neutrons,
a mass of stable isotope material placed in the path of neutrons from said neutron source;
a metallic collector electrically insulated from said stable isotope material by electrically insulating material; and
an electrical lead connected to said metallic collector,
wherein said stable isotope material has the property of capturing neutrons impinging thereon and being activated by neutron capture to a radioactive state having a subsequent decay chain during which at least one β-particle is emitted.

9. The neutron-activated direct current source as defined in claim 8, wherein said stable isotope material is $Dy^{164}$.

10. The neutron-activated direct current source as defined in claim 8, wherein said neutron source is a fuel core of a nuclear reactor.

11. A neutron-activatable regulated direct current source, comprising:
a mass of stable isotope material having the property of capturing neutrons from a neutron flux and being activated by neutron capture to a radioactive state having a subsequent decay chain during which at least one β-particle is emitted;
a metallic collector electrically insulated from said stable isotope material by electrically insulating material;
an electrical lead connected to said metallic collector;
a source resistor having a first terminal electrically connected to said electrical lead and a second terminal electrically connected to a first junction;
a Zener diode having a first terminal electrically connected to said first junction and a second terminal electrically connected to a second junction;
a load resistor having a first terminal electrically connected to said first junction and a second terminal electrically connected to said second junction;
a first voltage output terminal electrically connected to said first junction; and
a second voltage output terminal electrically connected to said second junction,
wherein said source resistor, said Zener diode and said load resistor are fabricated from radiation-hardened semiconductors capable of withstanding the γ-radiation fields encountered inside the reactor pressure vessel, but outside the core region, of a boiling water nuclear reactor.

12. The neutron-activatable regulated direct current source as defined in claim 11, wherein said stable isotope material is $Dy^{164}$.

13. The neutron-activatable regulated direct current source as defined in claim 11, wherein said stable isotope material is in the form of a metallic foil.

14. The neutron-activatable regulated direct current source as defined in claim 11, further comprising a substrate, wherein said stable isotope material is electroplated on a surface of said substrate.

15. The neutron-activatable regulated direct current source as defined in claim 11, wherein a surface of said electrically insulating material is metallized and said metallic collector is electroplated on said metallized surface of said electrically insulating material.

16. A boiling water reactor comprising:
a reactor pressure vessel;
a core of nuclear fuel located inside said reactor pressure vessel;
a radiation-hardened control circuit located inside said reactor pressure vessel and outside said core;
a radiation-hardened current-to-regulated voltage conversion circuit located inside said reactor pressure vessel and outside said core and electrically connected to supply regulated voltage to said irradiation-hardened control circuit; and
a neutron-activated direct current source located inside said reactor pressure vessel and outside said core and electrically connected to supply current to said radiation-hardened current-to-regulated voltage conversion circuit.

17. The boiling water reactor as defined in claim 16, wherein said neutron-activated direct current source comprises:
a mass of stable isotope material placed in the path of neutrons from said core;
a metallic collector electrically insulated from said stable isotope material by electrically insulating material; and
an electrical lead connected to said metallic collector,
wherein said stable isotope material has the property of capturing neutrons impinging thereon and being activated by neutron capture to a radioactive state having a subsequent decay chain during which at least one β-particle is emitted.

18. The boiling water reactor as defined in claim 17, wherein said stable isotope material is $Dy^{164}$.

19. The boiling water reactor as defined in claim 17, wherein said current-to-regulated voltage conversion circuit comprises:

a source resistor having a first terminal electrically connected to said electrical lead and a second terminal electrically connected to a first junction;

a Zener diode having a first terminal electrically connected to said first junction and a second terminal electrically connected to a second junction;

a load resistor having a first terminal electrically connected to said first junction and a second terminal electrically connected to said second junction;

a first voltage output terminal electrically connected to said first junction; and a second voltage output terminal electrically connected to said second junction, wherein said source resistor, said Zener diode and said load resistor are fabricated from radiation-hardened semiconductors capable of withstanding the γ-radiation fields encountered inside said reactor pressure vessel, but outside said core.

20. The boiling water reactor as defined in claim 19, wherein said control circuit comprises:

a first resistor;

a differential amplifier having a first input electrically connected to a third junction, a second input electrically connected to said first resistor, and an output for outputting a voltage signal proportional to the difference between the voltage signals at said first and second inputs, wherein said first terminal is electrically connected to said third junction, said second terminal is electrically connected to a fourth junction, and said first resistor is electrically connected to said fourth junction;

a second resistor electrically connected to said output of said differential amplifier;

a third resistor electrically connected to said third junction; and an operational amplifier having a first input electrically connected to said second resistor, a second input electrically connected to said fourth junction, and an output connected to said third resistor, wherein said first, second and third resistors, said differential amplifier, and said operational amplifier are fabricated from radiation-hardened semiconductors capable of withstanding the γ-radiation fields encountered inside said reactor pressure vessel, but outside said core.

* * * * *